US011133679B2

(12) United States Patent
Hart et al.

(10) Patent No.: US 11,133,679 B2
(45) Date of Patent: Sep. 28, 2021

(54) SYSTEM AND METHOD FOR OPERATING A HYBRID ENERGY FACILITY HAVING MULTIPLE POWER SOURCES

(71) Applicant: General Electric Company, Schenectady, NY (US)

(72) Inventors: Patrick Hammel Hart, Ballston Lake, NY (US); Alina Fatima Moosvi, Ballston Spa, NY (US); Charles Joseph Kosuth, Albany, NY (US); Gissel Idaly Gardea-Torres, Greenville, SC (US); Enno Ubben, Steinfurt (DE)

(73) Assignee: General Electric Company, Schenectady, NY (US)

( * ) Notice: Subject to any disclaimer, the term of this patent is extended or adjusted under 35 U.S.C. 154(b) by 142 days.

(21) Appl. No.: 16/287,135

(22) Filed: Feb. 27, 2019

(65) Prior Publication Data

US 2020/0274365 A1 Aug. 27, 2020

(51) Int. Cl.
*H02J 3/00* (2006.01)
*H02J 3/38* (2006.01)
*F03D 7/04* (2006.01)
*H02J 3/28* (2006.01)

(52) U.S. Cl.
CPC ............. *H02J 3/386* (2013.01); *F03D 7/048* (2013.01); *H02J 3/28* (2013.01); *H02J 3/383* (2013.01); *F05B 2270/337* (2013.01)

(58) Field of Classification Search
CPC .... H02J 3/386; H02J 3/28; H02J 3/383; H02J 3/388; H02J 2300/00; H02J 3/40
See application file for complete search history.

(56) References Cited

U.S. PATENT DOCUMENTS

| 8,290,634 B2 | 10/2012 | Larsen et al. |
| 9,407,186 B2 | 8/2016 | Babazadeh et al. |
| 9,496,812 B2 | 11/2016 | Kragelund et al. |

(Continued)

FOREIGN PATENT DOCUMENTS

| DE | 102016007098 A1 | 12/2017 |
| WO | WO2018093593 A1 | 5/2018 |

OTHER PUBLICATIONS

Knudsen et al., Distributed Control of Large-Scale Offshore Wind Farms, European Wind Energy Conference and Exhibition, EWEC, 2009, 8 pages.

(Continued)

*Primary Examiner* — Hal Kaplan
*Assistant Examiner* — Joseph N Inge
(74) *Attorney, Agent, or Firm* — Dority & Manning, P.A.

(57) ABSTRACT

A method for operating a renewable energy facility having a plurality of power sources includes defining a plurality of modes of operation for each of the plurality of power sources. The method also includes receiving one or more required active power set points for the renewable energy facility and/or groups of the plurality of power sources. Further, the method includes determining an operating mode command that defines which of the plurality of modes of operation to use for each of the plurality of power sources to reach the one or more required active power set points. Moreover, the method includes dynamically switching into the plurality of modes of operation defined in the operating mode command.

17 Claims, 9 Drawing Sheets

(56) References Cited

U.S. PATENT DOCUMENTS

| | | |
|---|---|---|
| 9,556,852 B2 | 1/2017 | Babazadeh et al. |
| 9,660,448 B2 | 5/2017 | Ellena et al. |
| 9,709,035 B2 | 7/2017 | Sagi et al. |
| 9,822,766 B2 | 11/2017 | Cardinal et al. |
| 9,915,243 B2 | 3/2018 | Sagi et al. |
| 1,001,221 A1 | 7/2018 | Kjaer et al. |
| 1,009,700 A1 | 10/2018 | Hart et al. |
| 2004/0027004 A1 | 2/2004 | Bayoumi et al. |
| 2009/0055030 A1* | 2/2009 | Mayor .................... H02J 3/381 700/287 |
| 2011/0166717 A1* | 7/2011 | Yasugi .................... F03D 7/048 700/287 |
| 2012/0053751 A1* | 3/2012 | Borresen .................. H02J 3/46 700/297 |
| 2013/0158680 A1* | 6/2013 | Fuller .................. G05B 13/048 700/29 |
| 2016/0211664 A1* | 7/2016 | Subbotin .................... H02J 3/00 |
| 2017/0040839 A1* | 2/2017 | Srivastava .............. H02J 3/381 |
| 2017/0067445 A1 | 3/2017 | Carulla |
| 2019/0052083 A1* | 2/2019 | Lucas, Jr. ................. H02J 3/18 |
| 2020/0271098 A1* | 8/2020 | Hart .......................... H02J 3/46 |

OTHER PUBLICATIONS

Raducu et al., Design and Implementation of a Hybrid Power Plant Controller, 3rd International Hybrid Power Systems Workshop, May 8-9, 2018, 12 Pages.
European Search Report, dated Apr. 28, 2020 for EP Application No. 20159264.9.

* cited by examiner

SYSTEM AND METHOD FOR OPERATING A HYBRID ENERGY FACILITY HAVING MULTIPLE POWER SOURCES

FIELD

The present subject matter relates generally to hybrid renewable energy facilities and, more particularly, to systems and methods for operating a hybrid renewable energy facility having a plurality of power sources with different response rates.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy of wind using known airfoil principles. The rotor blades transmit the kinetic energy in the form of rotational energy so as to turn a main shaft coupling the rotor blades to a gearbox, or if a gearbox is not used, directly to the generator. The generator then converts the mechanical energy to electrical energy that may be deployed to a utility grid.

In some instances, additional energy sources may also be employed in a wind farm. For example, energy storage devices (ESDs) may be used in wind and/or solar farms to fulfill a specific use case. Example ESDs could be batteries, supercapacitors, pumped storage, compressed gas storage, flywheels, and/or any other device in which, or means by which energy can be stored for later use. A typical use case for ESDs in a wind farm is to store the energy produced by the wind turbines when the wind farm is curtailed by the grid operator and to release and sell the energy when the curtailment is lifted. ESDs can also be used to supply the energy consumed by the auxiliary loads and losses inside the wind farm. Auxiliary loads represent the energy consumed by the devices inside the wind turbines such as yaw motors, various pumps or fans, and/or heaters.

With the increase in multiple-asset power production facilities being built, it is beneficial to improve the performance of such facilities and to extract more value from each of the assets. In general, it is desirable to produce power using the most economical power source(s) of the renewable energy facility, while achieving the desired performance required by the environment thereof.

In many instances, the power sources have different speeds of responses, capabilities of their power output, and/or ideal operation conditions, which ultimately affect the power generated by the overall facility and how it is portioned between the different sources. For conventional facilities, undesired operating conditions can occur from manual/fixed enabling/disabling of the power sources, such as inefficient performance, curtailment of the power sources, and accelerated degradation thereof.

Accordingly, the present disclosure is directed to improved systems and methods for operating a hybrid renewable energy facility having a plurality of power sources with different response rates using a closed-loop control system.

BRIEF DESCRIPTION

Aspects and advantages of the invention will be set forth in part in the following description, or may be obvious from the description, or may be learned through practice of the invention.

In one aspect, the present disclosure is directed to a method for operating a renewable energy facility having a plurality of power sources. The method includes defining a plurality of modes of operation for each of the plurality of power sources. The method also includes receiving one or more required active power set points for the renewable energy facility and/or groups of the plurality of power sources. Further, the method includes determining an operating mode command that defines which of the plurality of modes of operation to use for each of the plurality of power sources to reach the one or more required active power set points. Moreover, the method includes dynamically switching into the plurality of modes of operation defined in the operating mode command.

In one embodiment, the method may include dynamically switching into the plurality of modes of operation as a function of an interface type that the one or more required active power set points was received from, criticality of the command, curtailment priorities of the plurality of power sources, and/or capabilities of the plurality of energy sources. In another embodiment, the modes of operation may include individual power source control, group power source control, farm-level control, or combinations thereof. As such, the individual or group power source control may include operating each of the plurality of power sources or groups of power sources based on individual or group power set points, whereas the farm-level control may include operating the renewable energy facility based on a farm-level power set point.

In further embodiments, the method may include prioritizing an order in which the plurality of power sources reach the farm-level power set point based on a priority scheme comprising facility requirements, life of the plurality of power sources, response rate of the plurality of power sources, economic incentives of operating the plurality of power energy sources, and/or operating costs of the plurality of power sources.

In additional embodiments, the method may include operating the renewable energy facility in dual modes of operation wherein one or more of the power sources or groups thereof follow individual or group power source control while other power sources follow the farm-level control.

In several embodiments, the method may include determining the operating mode command so as to optimize efficiency within each power source depending on a given forecast, schedule, and/or power requirements of the renewable energy facility. In particular embodiments, the method may include controlling the hybrid renewable energy facility via a closed loop architecture.

In yet another embodiment, determining the operating mode command that defines which of the plurality of modes of operation to use for each of the plurality of power sources to meet the one or more required active power set points may include defining one or more power source classes and/or losses for each of the plurality of power sources, determining a response rate of each of the plurality of power sources, and determining the operating mode based on the one or more classes and/or the losses and the response rate.

In certain embodiments, the power sources may include one or more of the following: a solar panel, an energy storage device, a wind turbine, a thermal power generation source, a hydropower source, or similar.

In another aspect, the present disclosure is directed to a hybrid renewable energy facility connected to a power grid. The hybrid renewable energy facility includes a plurality of power sources that can respond to power commands at different rates and one or more controllers communicatively coupled to the plurality of power sources. The controller(s) are configured to perform a plurality of operations, including but not limited to providing a plurality of modes of operation for each of the plurality of power sources, determining an operating mode command that defines which of the plurality of modes of operation to use for each of the plurality of power sources to reach one or more required active power set points for the renewable energy facility and/or groups of the plurality of power sources, and dynamically switching into the plurality of modes of operation defined in the operating mode command. It should be understood that the hybrid renewable energy facility may further include any of the additional features described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
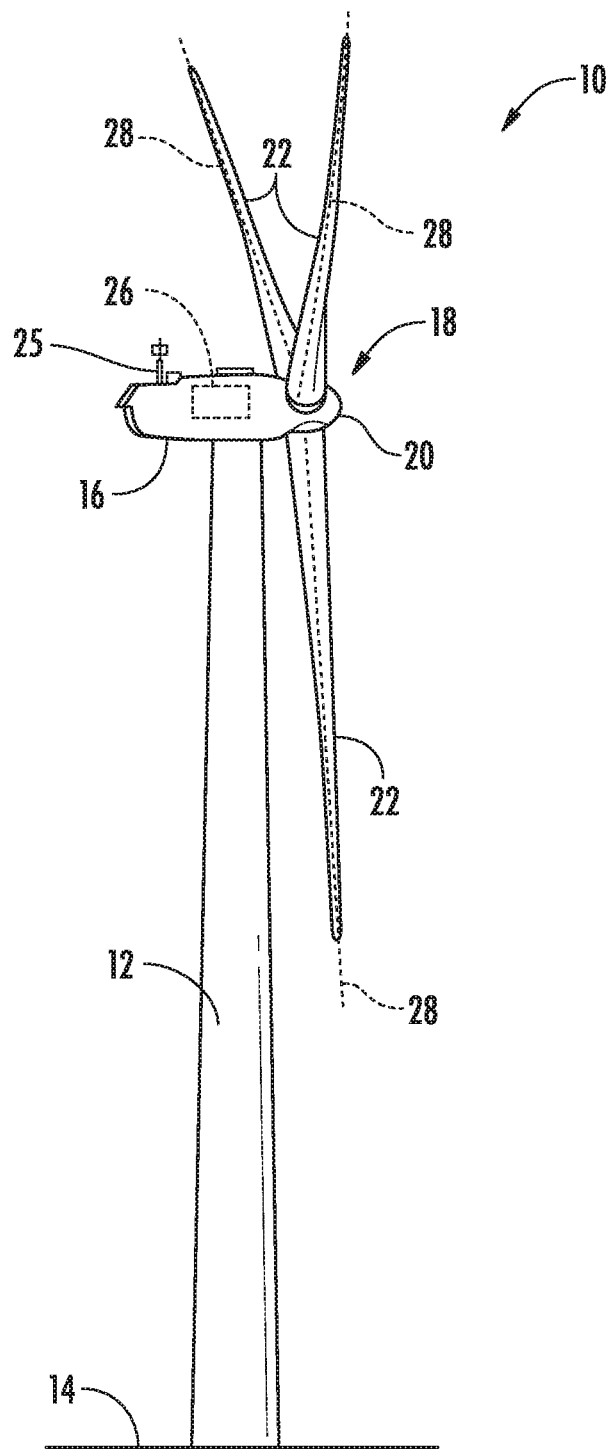
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Mode switching within a hybrid renewable energy facility with multiple power sources or assets is critical for operating a multi-asset facility capable of responding to set points from various interfaces, such as interfaces that enable optimizing plant revenue based on operational set points, interfaces that allow commands from a grid operator, or SCADA interfaces. An important aspect of mode switching is enabling individual or group-level power regulation or farm-level power regulation for the plurality of power sources within the facility. The controller may receive an operating mode command that specifies which asset or assets to use to meet the active power set point and/or dynamically switch into the correct operating mode depending on the interface type that the set point was received from.

Within a hybrid facility, where there are multiple sources of energy, the facility can operate within a mode where it follows a specific farm-level power set point or the farm can operate in separate group-level power set points to optimize efficiency within each asset depending on the given forecast, power generation schedule, or power requirements. Additionally, the facility can operate in a dual mode where some asset groups follow individual set points, while others follow the farm-level set point. The controller will assess the active power set points, power output of the farm, capabilities of the groups, interface types, and direction of change of set points to determine when to switch between group-level and farm-level modes or operate in dual mode.

Referring now to the drawings, FIG. 1 illustrates perspective view of one embodiment of a wind turbine 10 according to the present disclosure. As shown, the wind turbine 10 includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

Figure 2:
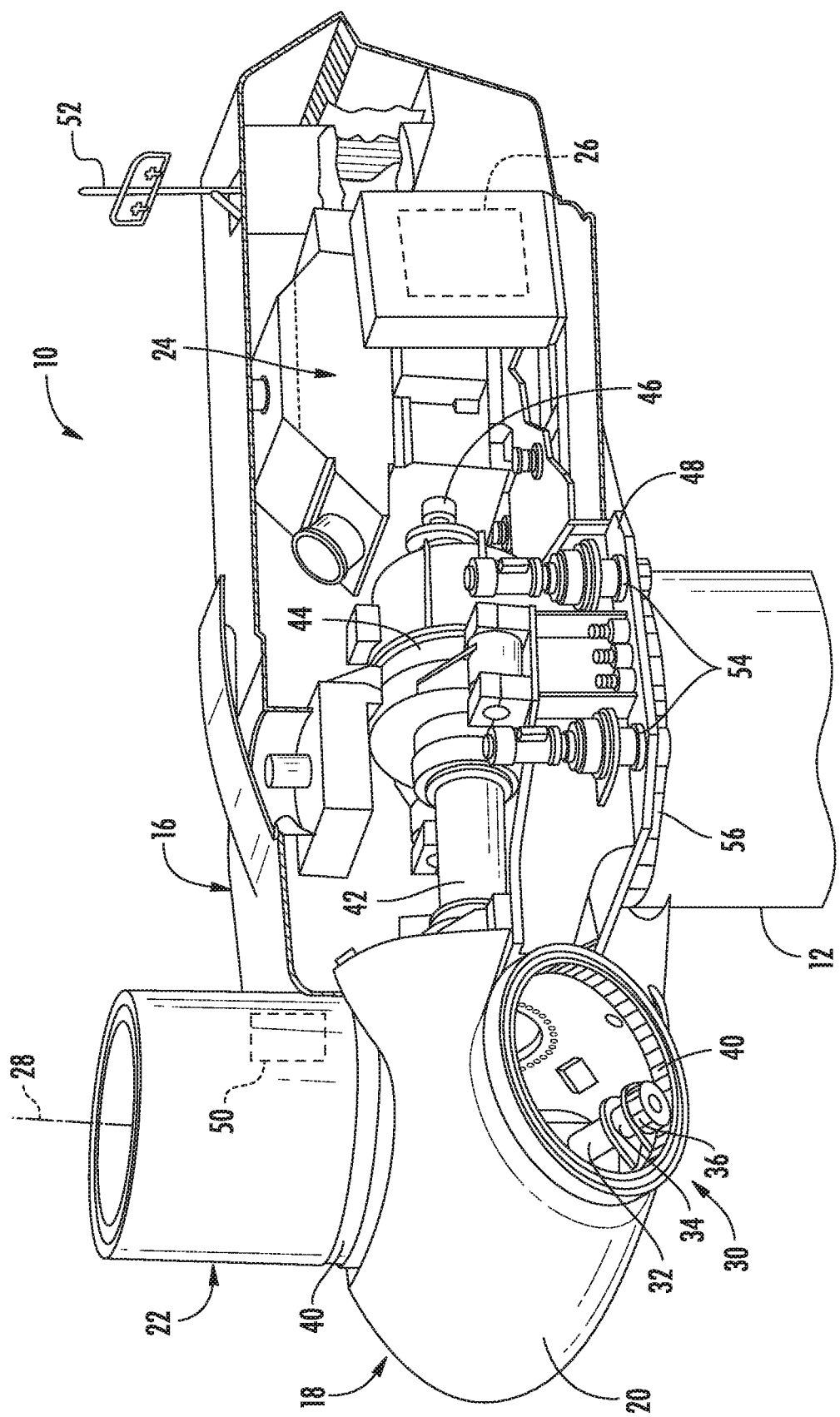
FIG. 2 illustrates a perspective, internal view of one embodiment of a nacelle of a wind turbine according to the present disclosure.

Referring now to FIG. 2, a simplified, internal view of one embodiment of the nacelle 16 of the wind turbine 10 is illustrated. As shown, a generator 24 may be disposed within the nacelle 16. In general, the generator 24 may be coupled to the rotor 18 of the wind turbine 10 for generating electrical power from the rotational energy generated by the rotor 18. For example, the rotor 18 may include a main shaft 46 coupled to the hub 20 for rotation therewith. The generator 24 may then be coupled to the main shaft 46 such that rotation of the main shaft 46 drives the generator 24. For instance, in the illustrated embodiment, the generator 24 includes a generator shaft 46 rotatably coupled to the main shaft 46 through a gearbox 44. However, in other embodiments, it should be appreciated that the generator shaft 46 may be rotatably coupled directly to the main shaft 46. Alternatively, the generator 24 may be directly rotatably coupled to the main shaft 46. In addition, as shown, it should be appreciated that the main shaft 46 may generally be supported within the nacelle 16 by a support frame or bedplate 48 positioned atop the wind turbine tower 12.

As shown in FIGS. 1 and 2, the wind turbine 10 may also include a turbine control system or a turbine controller 26 within the nacelle 16. For example, as shown in FIG. 2, the turbine controller 26 is disposed within a control cabinet mounted to a portion of the nacelle 16. However, it should be appreciated that the turbine controller 26 may be disposed at any location on or in the wind turbine 10, at any location on the support surface 14 or generally at any other location. The turbine controller 26 may generally be configured to control the various operating modes (e.g., start-up or shut-down sequences) and/or components of the wind turbine 10.

Each rotor blade 22 may also include a pitch adjustment mechanism 30 configured to rotate each rotor blade 22 about its pitch axis 28. Further, each pitch adjustment mechanism 30 may include a pitch drive motor 32 (e.g., any suitable electric, hydraulic, or pneumatic motor), a pitch drive gearbox 34, and a pitch drive pinion 36. In such embodiments, the pitch drive motor 32 may be coupled to the pitch drive gearbox 34 so that the pitch drive motor 32 imparts mechanical force to the pitch drive gearbox 34. Similarly, the pitch drive gearbox 34 may be coupled to the pitch drive pinion 36 for rotation therewith. The pitch drive pinion 36 may, in turn, be in rotational engagement with a pitch bearing 40 coupled between the hub 20 and a corresponding rotor blade 22 such that rotation of the pitch drive pinion 36 causes rotation of the pitch bearing 40. Thus, in such embodiments, rotation of the pitch drive motor 32 drives the pitch drive gearbox 34 and the pitch drive pinion 36, thereby rotating the pitch bearing 40 and the rotor blade 22 about the pitch axis 28. Similarly, the wind turbine 10 may include one or more yaw drive mechanisms 54 communicatively coupled to the controller 26, with each yaw drive mechanism(s) 54 being configured to change the angle of the nacelle 16 relative to the wind (e.g., by engaging a yaw bearing 56 of the wind turbine 10).

In addition, as shown in FIG. 2, one or more sensors 50, 52 may be provided on the wind turbine 10. More specifically, as shown, a blade sensor 50 may be configured with one or more of the rotor blades 22 to monitor the rotor blades 22. Further, as shown, a wind sensor 52 may be provided on the wind turbine 10 for measuring various wind conditions. For example, the wind sensor 50 may a wind vane, and anemometer, a LIDAR sensor, or another suitable wind sensor. As such, the sensors 50, 52 may further be in communication with the controller 26, and may provide related information to the controller 26.

It should also be appreciated that, as used herein, the term "monitor" and variations thereof indicates that the various sensors of the wind turbine 10 may be configured to provide a direct measurement of the parameters being monitored and/or an indirect measurement of such parameters. Thus, the sensors described herein may, for example, be used to generate signals relating to the parameter being monitored, which can then be utilized by the controller 26 to determine the condition.

Figure 3:
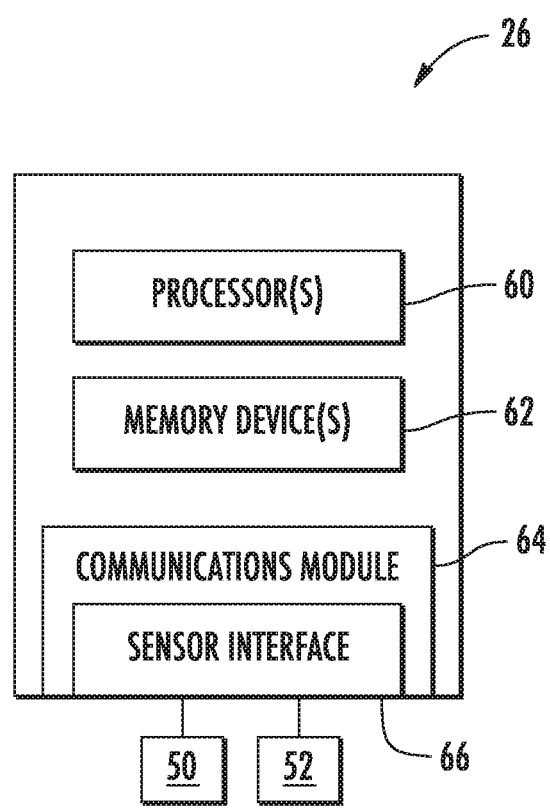
FIG. 3 illustrates a schematic diagram of one embodiment of suitable components that may be included in a wind turbine controller according to the present disclosure.

Referring now to FIG. 3, there is illustrated a block diagram of one embodiment of suitable components that may be included within the controllers 26 according to the present disclosure. As shown, the controllers 26 of the present disclosure may include one or more processor(s) 60 and associated memory device(s) 62 configured to perform a variety of computer-implemented functions (e.g., performing the methods, steps, calculations and the like and storing relevant data as disclosed herein). Additionally, the controllers 26 may also include a communications module 64 to facilitate communications between the controllers 26 and the various components of the wind turbine 10. Further, the communications module 64 may include a sensor interface 66 (e.g., one or more analog-to-digital converters) to permit signals transmitted from one or more sensors 50, 52 to be converted into signals that can be understood and processed by the processors 60. It should be appreciated that the sensors 50, 52 may be communicatively coupled to the communications module 64 using any suitable means. For example, as shown in FIG. 3, the sensors 50, 52 are coupled to the sensor interface 66 via a wired connection. However, in other embodiments, the sensors 50, 52 may be coupled to the sensor interface 66 via a wireless connection, such as by using any suitable wireless communications protocol known in the art.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 62 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 62 may generally be configured to store suitable computer-readable instructions that, when implemented by the processor(s) 60, configure the controller 26 to perform various functions including, but not limited to, transmitting suitable control signals to implement corrective action(s) in response to a distance signal exceeding a predetermined threshold as described herein, as well as various other suitable computer-implemented functions.

Figure 4:
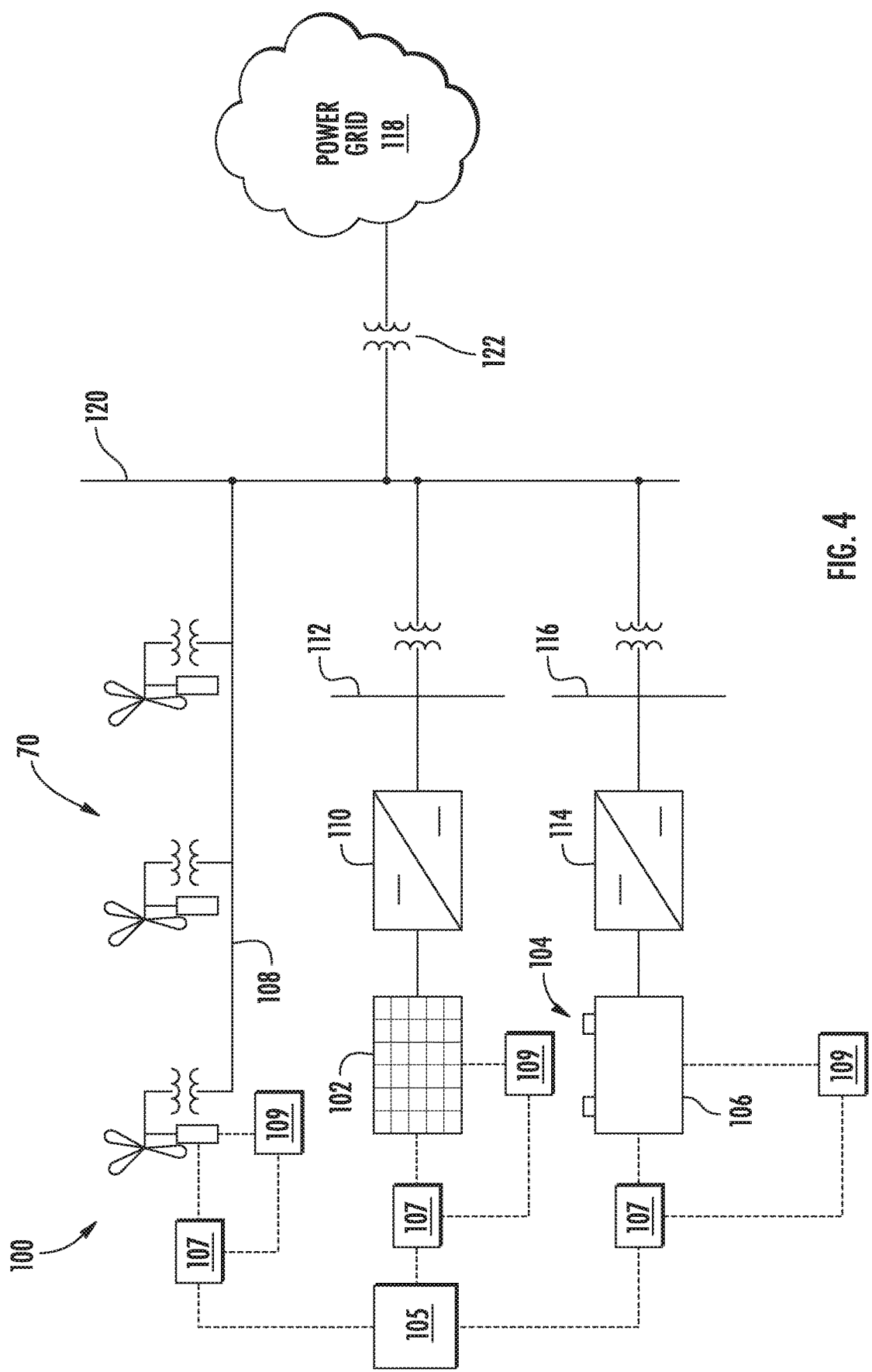
FIG. 4 illustrates a schematic diagram of one embodiment of a hybrid renewably energy facility according to the present disclosure.

Referring now to the drawings, FIG. 4 illustrates a schematic diagram of one embodiment of a hybrid renewable energy facility 100 according to the present disclosure. As shown, the illustrated renewable energy facility 100 depicts multiple sources of power (also referred to herein as assets) including, for example, the wind farm 70 having a plurality of wind turbines 72, one or more solar panels 102, and/or a battery power source 104, all of which may be controlled by a farm-level controller 105. In addition, as shown, each of the power sources may have a group controller 107 that follows a similar feedback and common set point, observing the same error, as the farm-controller 105. Furthermore, each individual power source may also include an individual controller 109.

The battery power source 104 described herein may be an electrical power source. For example, in certain embodiments, the battery power source 104 may include one or more energy storage devices (ESDs) 106, including but not limited to batteries (e.g. a lithium ion battery, a sodium nickel chloride battery, a sodium sulfur battery, a nickel metal hydride battery, a nickel cadmium battery, etc.), fuel cells, supercapacitors, pumped storage, compressed gas storage, flywheels, and/or any other suitable device in which, or means by which energy can be stored for later use. For example, in one embodiment, the battery power source 104 may include one or more sodium nickel chloride batteries.

Still referring to FIG. 4, the wind farm 70 may be incorporated into the renewably energy facility 100 via bus 108. Moreover, as shown, the solar panel(s) 102 may be incorporated into the energy facility 100 via a solar inverter 110 that is connected to a low voltage DC bus 112. Further, as shown, the energy storage device(s) 106 may also be connected into the energy facility 100 via an energy storage inverter 114 that is connected to a separate low voltage DC bus 116. The various components of the renewable energy facility 100 can then be connected to the power grid 118 via bus 120. More specifically, as shown, the renewable energy facility 100 may be connected to the power grid 118 via a main transformer 122.

Figure 5:
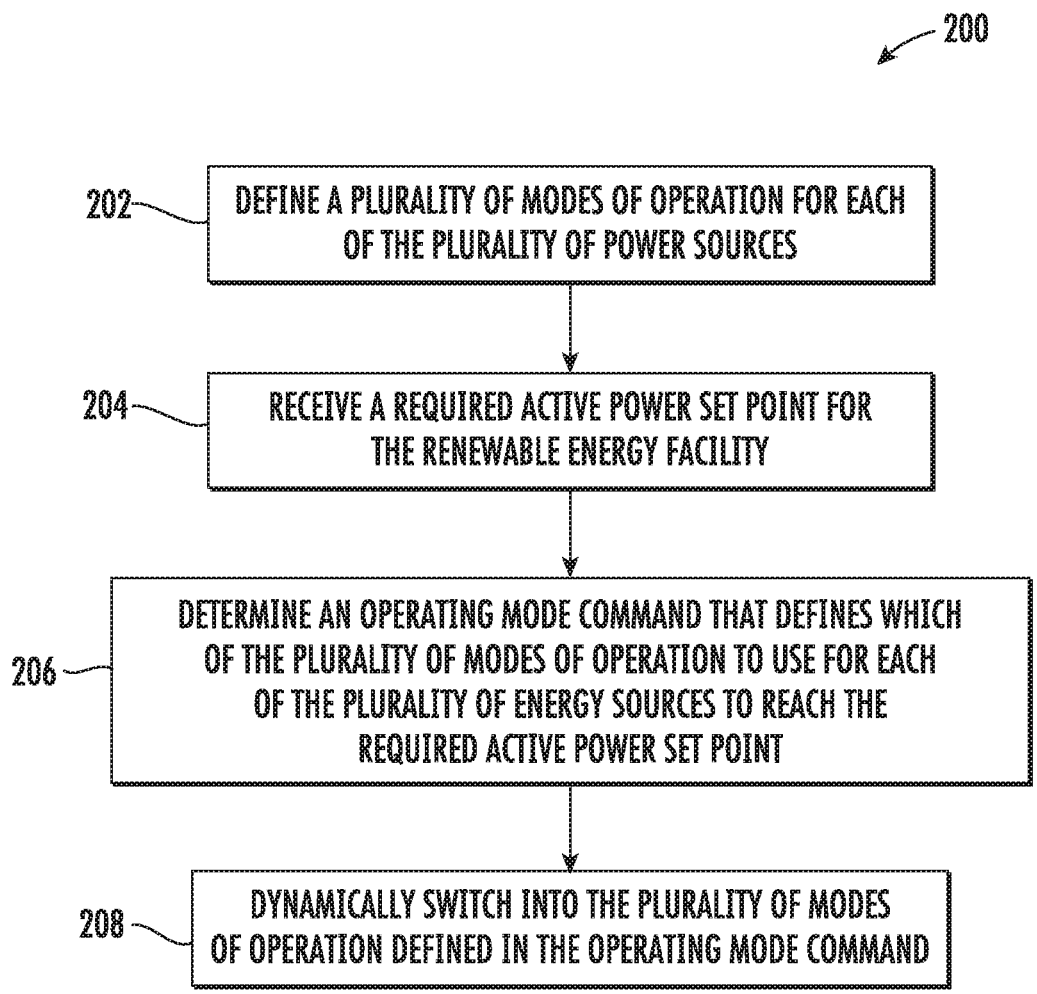
FIG. 5 illustrates a flow diagram of one embodiment of a method for operating a hybrid energy facility having a plurality of power sources according to the present disclosure.

Referring now to FIG. 5, a flow diagram of one embodiment of a method 200 for operating a renewable energy facility sources (such as a wind farm or a solar farm) having a plurality of power sources connected to a power grid in is illustrated. In general, the method 200 will be described herein with reference to the wind farm 70 shown in FIG. 5. However, it should be appreciated that the disclosed method 200 may be implemented with any renewable energy facility having any other suitable configurations. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at 202, the method 200 includes defining a plurality of modes of operation for each of the plurality of power sources. For example, in certain embodiments, the modes of operation may include individual power source control, group power source control, and farm-level control, and/or combinations thereof. As such, the individual or group power source control may include operating each of the plurality of power sources or groups of power sources based on individual or group power set points, whereas the farm-level control may include operating the renewable energy facility 100 based on a farm-level power set point. In certain embodiments, the method 200 may include operating the renewable energy facility 100 in dual modes of operation wherein one or more of the power sources or groups thereof follow individual or group power source control while other power sources follow the farm-level control, which can depend on a given forecast, schedule, and/or power set points of the renewable energy facility 100.

As shown at 204, the method 200 includes receiving one or more required active power set points for the renewable energy facility 100. As shown at 206, the method 200 includes determining an operating mode command that defines which of the plurality of modes of operation to use for each of the plurality of power sources to reach the one or more required active power set points. As shown at 208, the method 200 includes dynamically switching into the plurality of modes of operation defined in the operating mode command. More specifically, in one embodiment, the method 200 may include dynamically switching into the modes of operation defined in the operating mode command as a function of an interface type that the one or more required active power set points was received from.

Mode switching corresponds to a closed-loop control design controller that defines power source classes and losses corresponding to each individual power source that are handled automatically, thereby allowed the plant to operate smoothly even when a particular power source is unavailable. A set of logic enables/disables the farm-level or group-level control, driven by a set of conditions desired by the mode of operation and allows a quick response to the total power required without stressing slower power sources. This logic considers the criticality of the set point(s) and the incremental response required to meet it/them. Furthermore, this logic enables power regulation that considers intrinsic response speed of each power sources, which can potentially increase the life of each power source, and hence the overall life of the plant. The mode switching control architecture enables the power handoff between power sources and a simple approach to define the desired steady state output. The dynamic response is handled independently for each power source or power source group, which allows the overall facility output to respond as quickly as the fastest power source is capable of.

Furthermore, dynamic mode switching allows the hybrid facility 100 to respond to multiple power set points at once, enabling the facility 100 to meet a utility power demand, customer power demand, grid/market service power demand, and/or other interface power demands dynamically with a single power source group or multiple power source groups as needed. Additionally, the dynamic mode switching of the present disclosure ensures that the power output of the hybrid facility 100 at the point of interconnection (POI) will be grid compliant, while still allowing the individual control of power source groups when desired.

Figure 6:
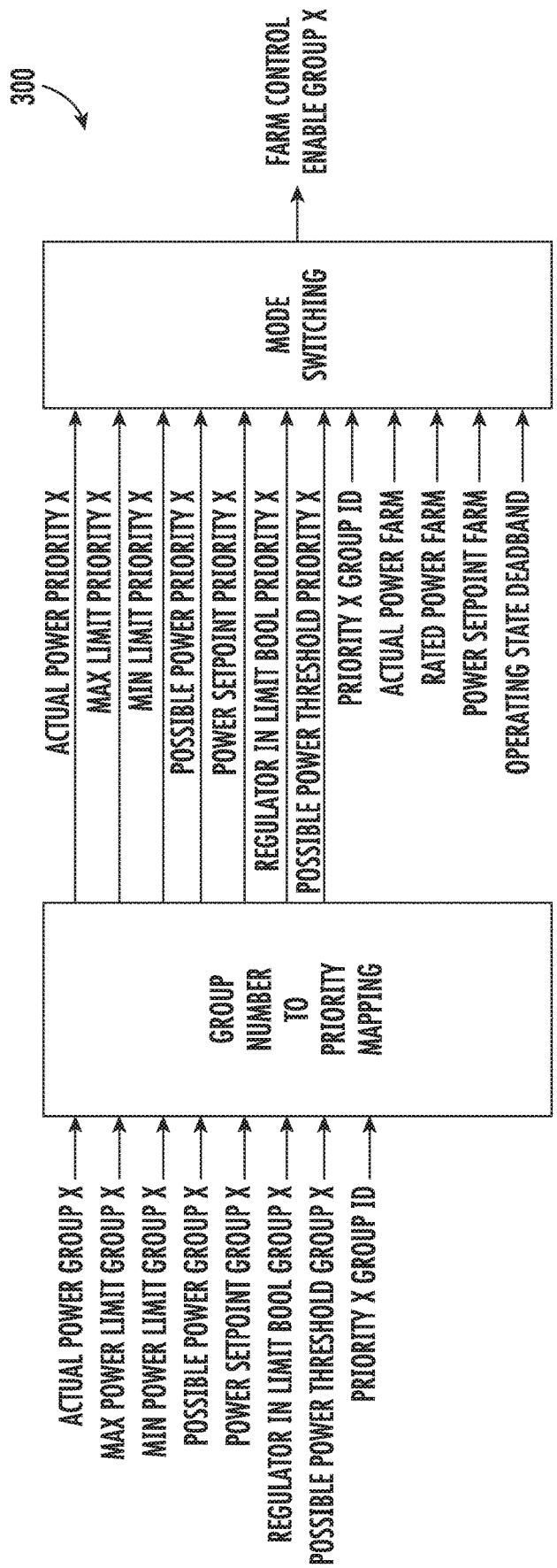
FIG. 6 illustrates a schematic diagram of one embodiment of a mode switching logic for a renewable energy facility having a plurality of power sources according to the present disclosure.

Referring now to FIG. 6, the method 200 may include controlling the hybrid renewable energy facility 100 via a closed loop architecture. This control architecture is generally used to dynamically enable/disable control of the different power sources, thereby preventing undesired operating conditions from occurring. More specifically, as shown, the renewable energy facility 100 is configured to utilize control logic 300 to enable/disable the set of requirements desired by the mode of operation that allows the facility 100 to follow a specific farm-level power set point or an individual power source power set points (e.g. Farm Control Enable Group X).

Figure 7:
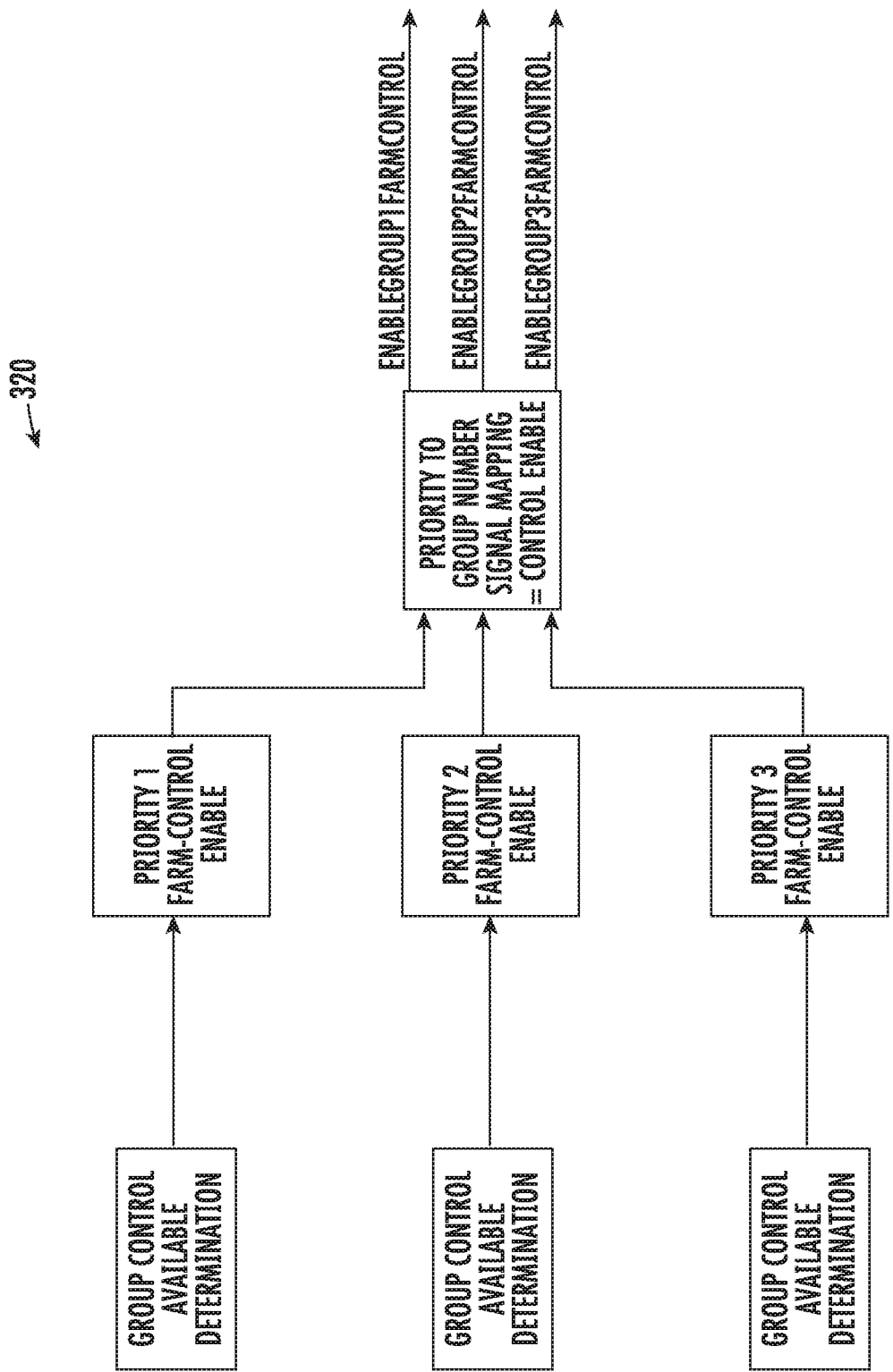
FIG. 7 illustrates a schematic diagram of one embodiment of a farm-level mode switching logic for a renewable energy facility having a plurality of power sources according to the present disclosure.

In certain embodiments, the primary modes of operation are defined as power source/group control or farm-level control. FIG. 7 illustrates farm-level control logic 320. Within the power source/group level control (Mode 1), all power source types follow individually-defined power set points within the constraints. In this scenario, the groups operating in group-level control are not needed to meet a higher-priority set point command, either because a higher-priority set point command is not active or other groups with a lower curtailment priority can be used to achieve the set point. Having the ability to control separate power sources allows the facility 100 to achieve an optimal performance or economic response while using the correct power sources that are suited for that task. In certain instances, conditions may include the scenario where multiple sources of power set points in the case of a curtailment command is issued to a specific power source type. In addition, for power source/group control, power set points can be provided by an external or internal specified service the facility 100 is trying to provide. In such embodiments, the external or internal specification may include which power source to use to meet the active power recommended set point.

Referring now to FIG. 7, within the farm-level control mode of operation, one or more power source types are used to maintain the farm-level power set point. As such, the control architecture 320 is configured to enable various power sources to maintain the farm-level power set point based on the predefined priorities of the facility 100. For example, the illustrated diagram includes three different groups of power sources by way of example. For each power source operating in the farm-level control mode, each power source attempts to achieve the farm-level power set point to the best of its ability within the constraints given in the defined priority scheme. Priority definitions can be configurable at an energy source group level. The order in which the power sources are defined to meet the needed farm-level power set point can be defined on a priority scheme (i.e. priority-base control of power sources) based on facility requirements, life of the power sources, speed of response, economic incentives, operating costs, etc. More specifically, as shown, the three illustrated groups are given three different priorities which define the order that farm-level control of the groups will be enabled if needed (e.g. EnableGroup1FarmControl, EnableGroup2FarmControl, and EnableGroup3FarmControl) to meet the farm-level power set point, in addition to consideration of their group capability and set point interfaces and criticality. The order by which the groups are disabled from farm-level control into group-level control is a function of their active group-level set points, capability, priority order, and actual power.

One example illustrating the mode switching according to the present disclosure is when the facility 100 experiences an over-frequency response where there are three available power sources: energy storage, wind, solar, hydro, or thermal. The energy storage can be prioritized due to its capability of a fast response compared to wind or solar. If the capability of the energy storage is exceeded, the logic can enable control to the wind and solar power sources. More specifically, in one specific example, the following power set points and corresponding priorities may include a facility 100 having 50 MW of wind, 50 MW of solar, and 10 MW of energy storage. In such an example, wind and solar may operate at rated power, with a total farm output of 100 MW. A curtailment command may be issued to 95 MW. Therefore, priority levels indicate that the energy storage source will absorb 5 MW until the maximum state of charge has been achieved. If the curtailment command is set to 75 MW, or the energy storage system has reduced its power capacity, the next lowest priority power source will be curtailed next. This continues until control of all power source groups have been enabled. Upon releasing from a curtailment, the power sources are configured to begin ramping to maximum possible power or to their group-level set point in reverse priority order, such that the power sources return to their optimal set points in the quickest manner possible, while still maintaining compliance to the farm-level set point if applicable.

Accordingly, there are several advantages that correspond to mode switching according to the present disclosure. For example, as mentioned, the order in which the power sources are defined within the farm-level power set point are based on the facility requirements, the life expectancy of the power sources, speed of response for each corresponding power source or at the farm level, operating cost, etc. This priority-scheme based method allows the power source in which is best suited for the external/internal command or power generated considering their benefits, capabilities, and combined power production.

Figure 8:
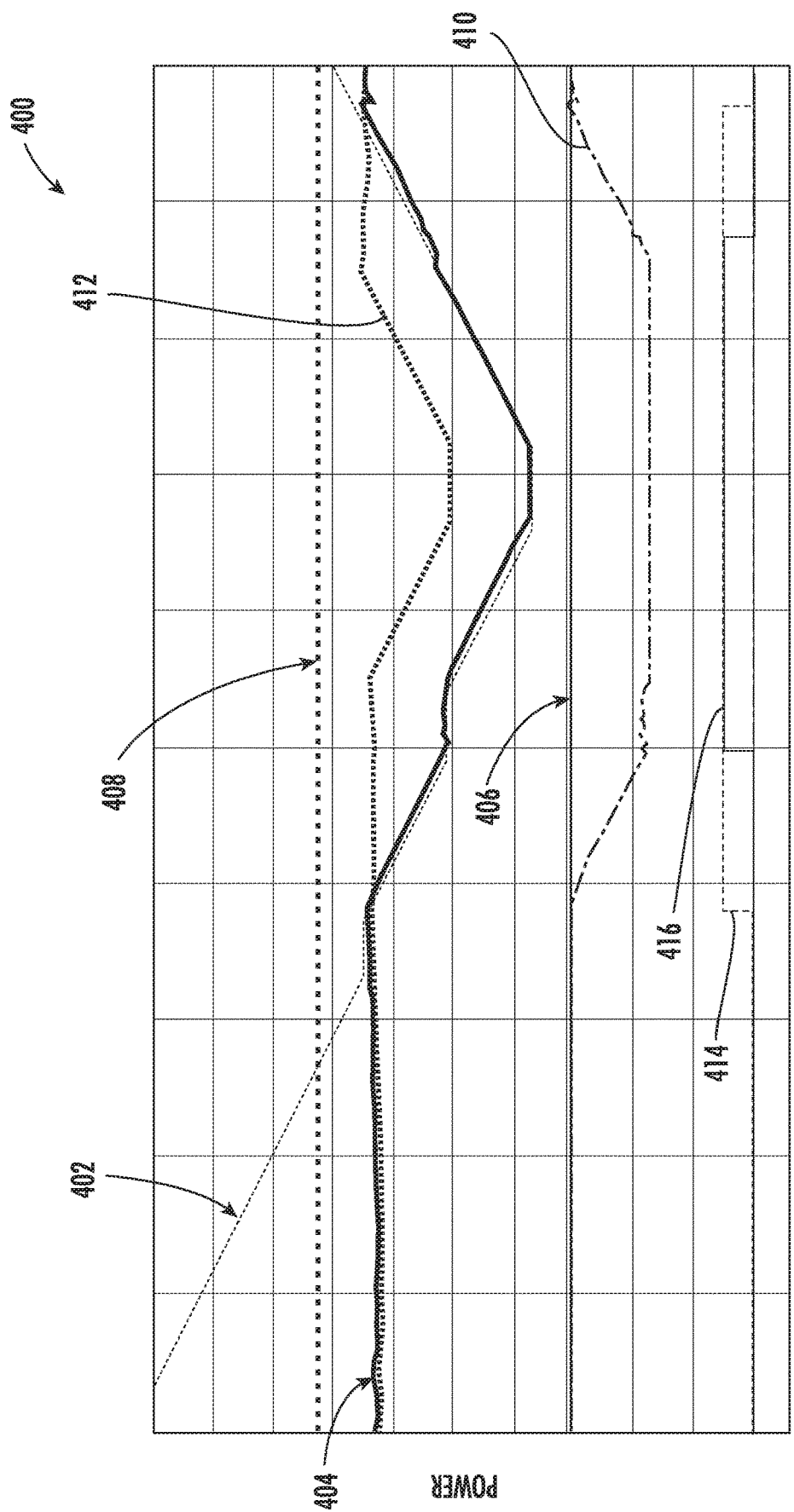
FIG. 8 illustrates a graph of one embodiment of illustrates a graph of one embodiment of power (y-axis) versus time (x-axis), particularly illustrating farm control enable the plurality of power sources.
Figure 9:
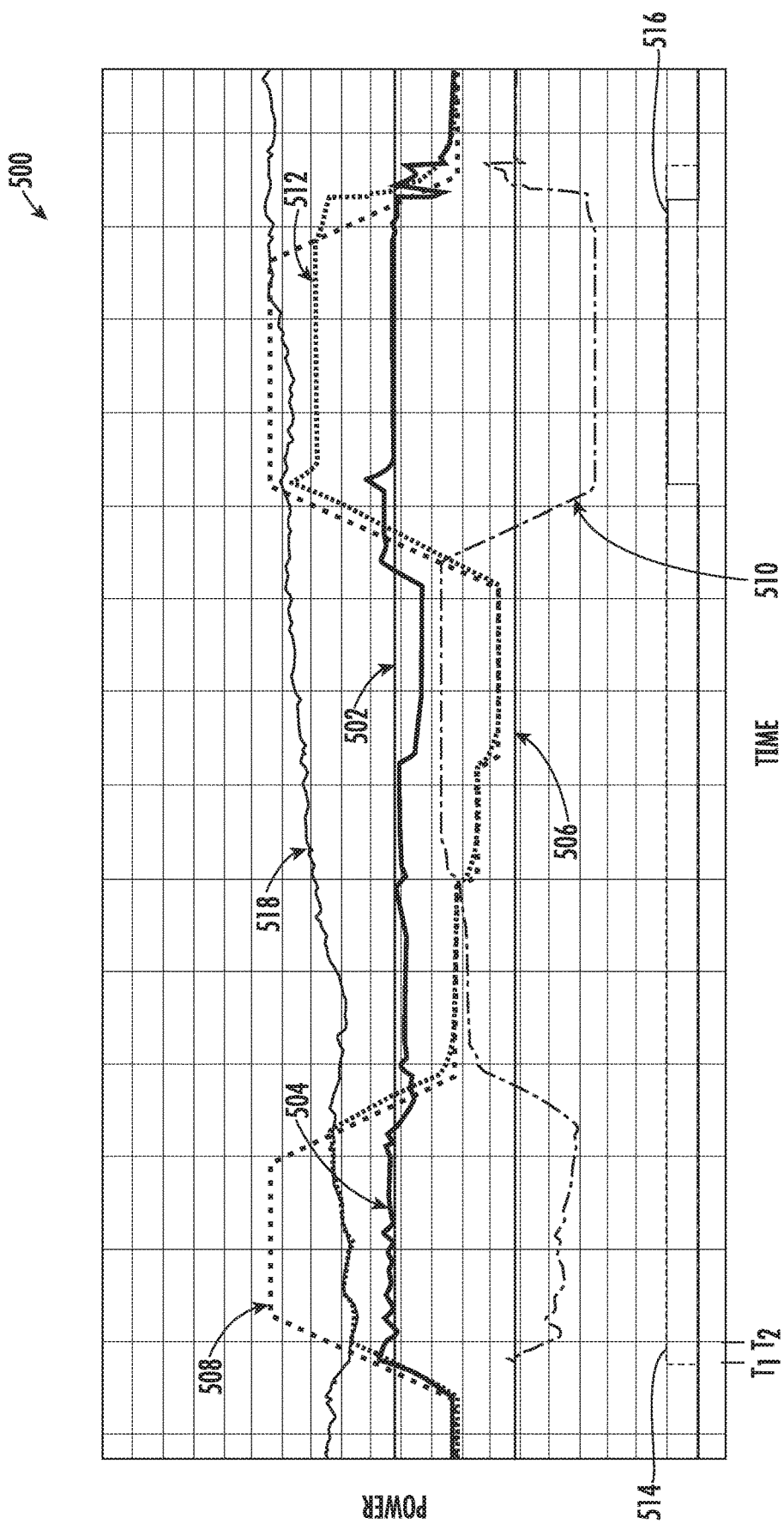
FIG. 9 illustrates a graph of one embodiment of power (y-axis) versus time (x-axis) for a constant farm-level power set point and a changing group-level power set point, where the energy storage power source maintains the farm-level power set point compliance while the solar power source runs at an optimal power set point according to the present disclosure.

Referring now to FIGS. 8 and 9, various graphs 400, 500 of one embodiment of power (y-axis) versus time (x-axis) are provided to illustrate the different response times of the farm, energy storage source, solar source, and wind source, respectively, according to the present disclosure. As shown particularly in FIG. 8, the farm-level power set point is represented by line 402 and the farm-level actual power is represented by line 404. Further, two different groups of power sources are represented by lines 406, 408, 410, 412. More specifically, the group-level power set points are represented by lines 406 and 408 and the group-level actual power is represented by lines 410 and 412. Both groups are operating in group control mode (i.e. the group controllers are operating according to their respective group-level power set point 406 and 408 prior to a curtailment event. Further, as shown, the farm-level power set point 402 ramps down to induce a curtailment event imposed by a high priority interface, such as a utility curtailment command. Once farm-level power set point 402 is below farm actual power 404, the first priority group (e.g. energy storage power 414) switches into the farm control mode and begins to curtail to meet the farm-level power set point 402. Once first group 414 has reached its limits and cannot curtail anymore, the second priority group 416 switches into farm control mode, deviates from its group-level power set point, and curtails to meet the farm-level power set point 402. As farm-level power set point ramps back up, the groups begin to disable farm control mode and return to group control mode. The enabling and disabling of farm control mode is illustrated via lines 414 and 416. This behavior allows the higher priority groups to remain operating at their optimal group-level power set points, which may be driven by factors such as economic incentives or lifting, while lower priority power sources respond to the farm-level power set point. Groups are able to return to their group-level power set points as soon as possible without sacrificing compliance to the farm power set point.

Referring now to FIG. 9, the graph 500 illustrates a constant farm-level set point 502. Simultaneously, both groups 514, 516 have group-level power set points 506, 508 enforced. At time $T_1$, both groups 514, 516 are operating in group-level mode and following their group-level power set points 506, 508, which still allows the respective groups to remain below the farm-level power set point 502. The group-level power set point 508 of group 516 increases from below possible power 518 to above possible power 518 (i.e. around time $T_2$), causing group 516 to raise its power output 512 to its maximum. This increase in power causes the farm actual power 504 to exceed the farm-level power set point 502. In this example, the farm-level power set point 502 is illustrated as coming from a higher priority interface, such as a utility power command. Therefore, adhering to the farm-level power set point 502 takes priority. The first priority group 514 (e.g. the energy storage power source 514) switches to farm control mode and begins to charge to maintain the farm-level power set point 502. Meanwhile, the second priority group 516 remains operating in group-level mode, representing a dual mode of control operation. The second priority group's group-level power set point 508 begins to decrease and then increase, and in the process the first priority group continues to maintain compliance to the farm-level power set point 502 by charging and discharging power 510. When the second priority group's group-level power set point 508 increase again, the second priority group must switch into farm control mode as the first group no longer has the capability to respond to the command. Upon the decrease in the group-level command, both groups slowly return to their group-level power set point 506, 508, respectively, taking into account priority order, actual power of the group, group power set point, and farm-level power.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating a hybrid renewable energy facility having a plurality of different power sources, the method comprising:
   defining, via a controller, a plurality of modes of operation for each of the plurality of different power sources, the plurality of modes of operation comprising, at least, individual power source control, group power source control, and farm-level control, the individual power source control comprising operating the renewable energy facility based on an individual set point for each of the plurality of different power sources, the group power source control comprising operating the renewable energy facility based on group set points for groups of the plurality of different power sources, the farm-level control comprising operating the renewable energy facility based on a farm-level power set point;
   receiving, via the controller, one or more required active power set points for the renewable energy facility;
   determining, via the controller, an operating mode command that defines which of the plurality of modes of operation to use for each of the plurality of different power sources to reach the one or more required active power set points; and,
   operating, via the controller, each of the plurality of different power sources by switching into the plurality of modes of operation defined in the operating mode command, wherein switching into the plurality of modes of operation defined in the operating mode command further comprises prioritizing an order in which the groups of the plurality of different power sources reach the farm-level power set point based on a combination of a priority scheme comprising facility requirements, life of the plurality of different power sources, economic incentives of operating the plurality of different power-sources, response rate of the plurality of different power sources, or operating costs of the plurality of different power sources.

2. The method of claim 1, further comprising dynamically switching into the plurality of modes of operation as a function of at least one of an interface type that the one or more required active power set points was received from, criticality of the command, curtailment priorities of the plurality of different power sources, or capabilities of the plurality of energy sources.

3. The method of claim 1, wherein the individual or group power source control comprises operating each of the plurality of different power sources based on individual or group power set points.

4. The method of claim 1, wherein the farm-level control comprises operating the renewable energy facility based on a farm-level power set point.

5. The method of claim 4, further comprising prioritizing an order in which the plurality of different power sources reach the farm-level power set point based on at least one of a priority scheme comprising facility requirements, life of the plurality of power sources, economic incentives of operating the plurality of power energy sources, response rate of the plurality of different power sources, or operating costs of the plurality of different power sources.

6. The method of claim 1, further comprising operating the renewable energy facility in dual modes of operation, wherein one or more of the different power sources follow the individual or group power source control while other power sources follow the farm-level control.

7. The method of claim 1, further comprising determining the operating mode command so as to optimize efficiency within each power source depending on at least one of a given forecast, schedule, or power requirements of the renewable energy facility.

8. The method of claim 1, further comprising controlling the hybrid renewable energy facility via a closed loop architecture.

9. The method of claim 1, wherein determining the operating mode command that defines which of the plurality of modes of operation to use for each of the plurality of different power sources to meet the one or more required active power set points further comprises:
   defining at least one of one or more power source classes and losses for each of the plurality of different power sources;
   determining a response rate of each of the plurality of different power sources; and,
   determining the operating mode based on at least one of the one or more classes and the losses and the response rate.

10. The method of claim 1, wherein the plurality of different power sources comprise at least two of the following: a solar panel, an energy storage device, a thermal power generation source, a hydropower source, or a wind turbine.

11. A hybrid renewable energy facility connected to a power grid, the hybrid renewable energy facility comprising:
   a plurality of different power sources that can respond to power commands at different rates; and,
   one or more controllers communicatively coupled to the plurality of power sources, the one or more controllers configured to perform a plurality of operations, the plurality of operations comprising:
   providing a plurality of modes of operation for each of the plurality of power sources, the plurality of modes of operation comprising individual power source control, group power source control, and farm-level control, the individual power source control comprising operating the renewable energy facility based on an individual set point for each of the plurality of different power sources, the group power source control comprising operating the renewable energy facility based on group set points for groups of the plurality of different power sources, the farm-level control comprising operating the renewable energy facility based on a farm-level power set point;
   determining an operating mode command that defines which of the plurality of modes of operation to use for each of the plurality of power sources to reach one or more required active power set points for the renewable energy facility; and, switching into the plurality of modes of operation defined in the operating mode command by prioritizing an order in which the groups of the plurality of different power sources reach the farm-level power set point based on a combination of a priority scheme comprising facility requirements, life of the plurality of different power sources, economic incentives of operating the plurality of different power-sources, response rate of the plurality of different power sources, or operating costs of the plurality of different power sources.

12. The system of claim 11, wherein the individual or group power source control comprises operating each of the plurality of different power sources based on individual or group power set points.

13. The system of claim 11, wherein the farm-level control comprises operating the renewable energy facility based on a farm-level power set point.

14. The system of claim 11, further comprising operating the renewable energy facility in dual modes of operation wherein one or more of the plurality of different power sources follow individual or group power source control while other power sources follow the farm-level control.

15. The system of claim 11, further comprising determining the operating mode command so as to optimize efficiency within each power source depending on at least one of a given forecast, schedule, or power requirements of the renewable energy facility.

16. The system of claim 11, further comprising controlling the hybrid renewable energy facility via a closed loop architecture.

17. The system of claim 11, wherein the plurality of different power sources comprise at least two of the following: a solar panel, an energy storage device, a thermal power generation source, a hydropower source, or a wind turbine.

* * * * *